Figure 1:
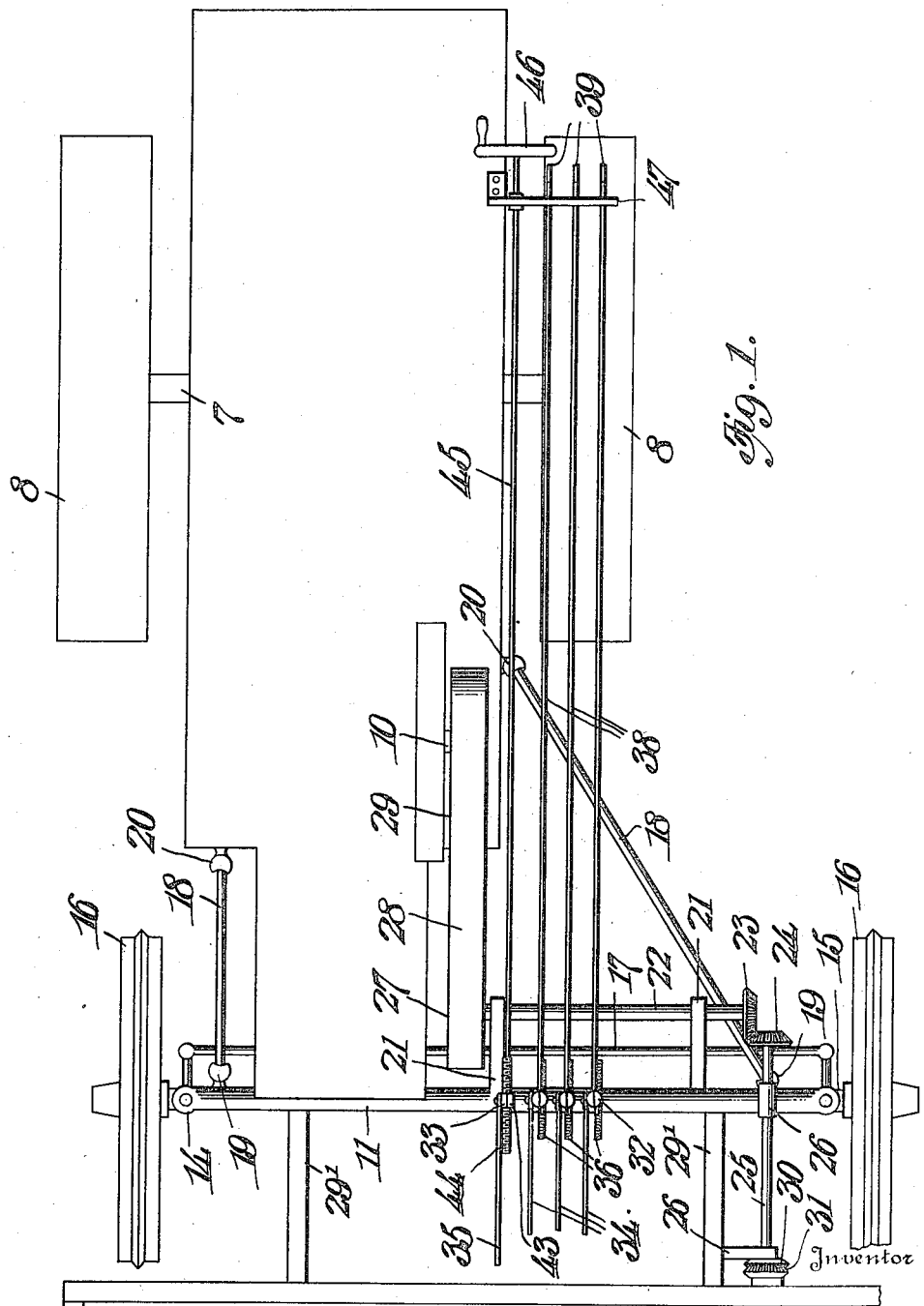

G. J. HUTTER.
ATTACHMENT FOR TRACTORS.
APPLICATION FILED JUNE 27, 1916.

1,241,120.

Patented Sept. 25, 1917.
3 SHEETS—SHEET 1.

Witnesses

Inventor
George J. Hutter.
By Perry A. Pattison.
Attorney

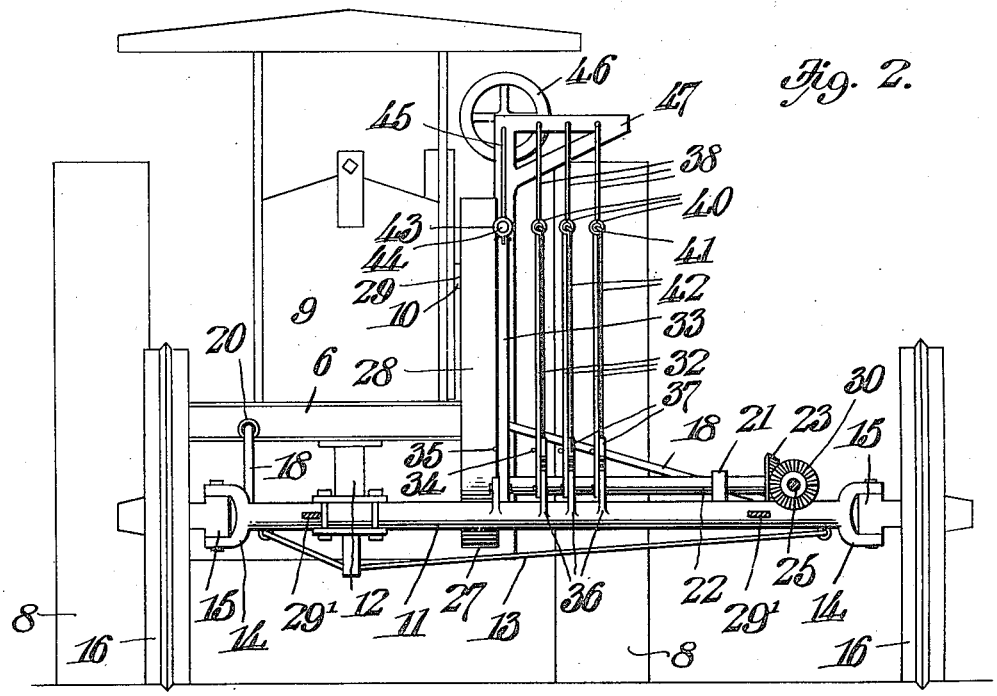
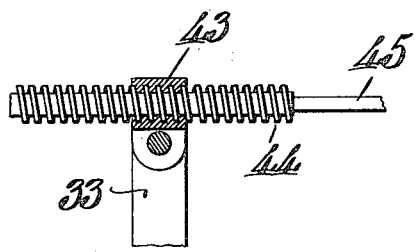

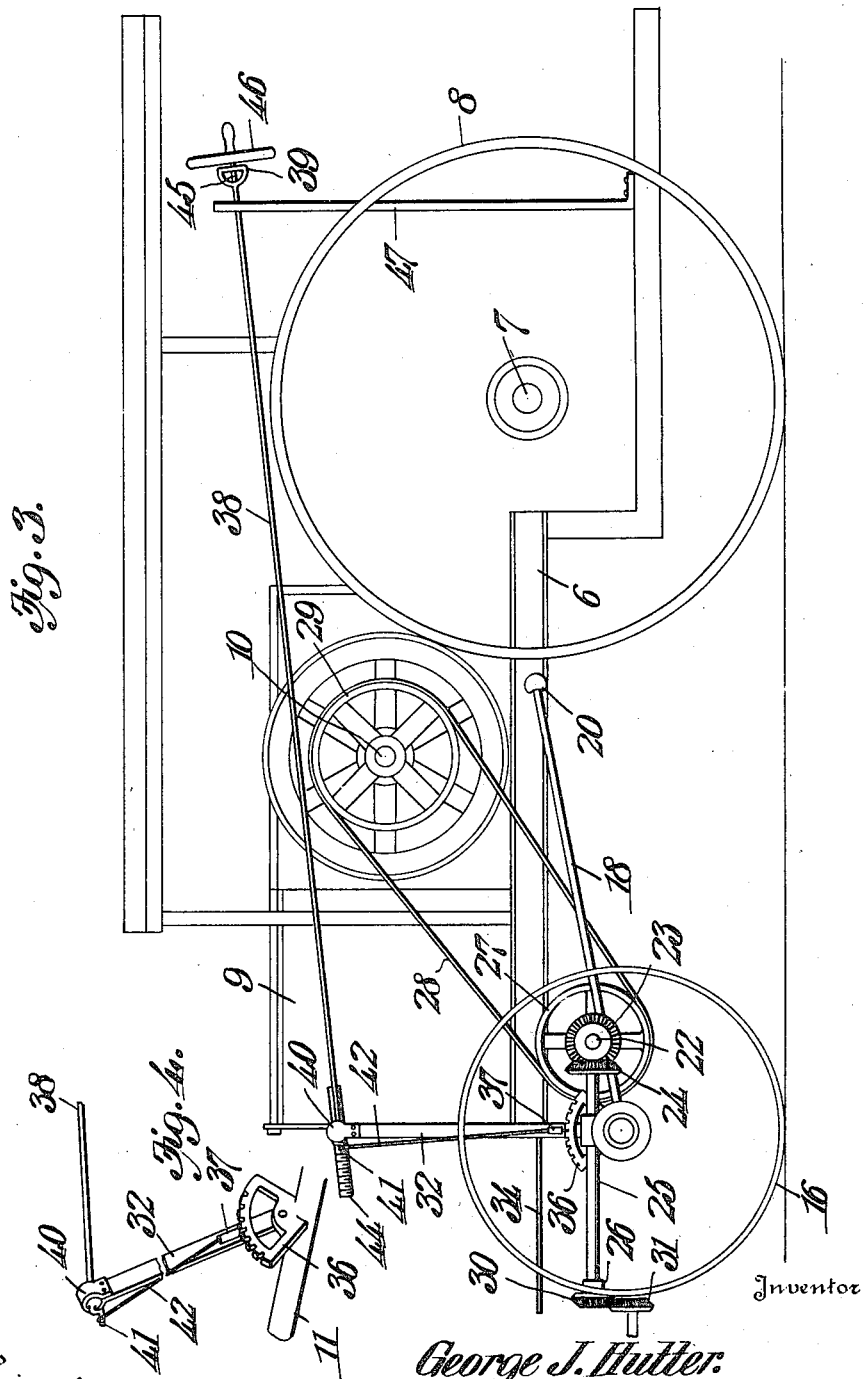

UNITED STATES PATENT OFFICE.

GEORGE J. HUTTER, OF CHERRYVALE, KANSAS.

ATTACHMENT FOR TRACTORS.

1,241,120.  Specification of Letters Patent.  Patented Sept. 25, 1917.

Application filed June 27, 1916. Serial No. 106,141.

*To all whom it may concern:*

Be it known that I, GEORGE J. HUTTER, a citizen of the United States, residing at Cherrydale, in the county of Montgomery and State of Kansas, have invented certain new and useful Improvements in Attachments for Tractors, of which the following is a specification.

This invention relates to tractors, and may be more particularly identified with that class of tractors as are used commonly for hauling or drawing agricultural machinery of various types.

The invention aims primarily to provide a tractor of such construction as may be capable of being used for drawing the greatest number of various forms of agricultural machinery.

A further object of the invention is to provide a tractor of such construction and arrangement that the various movable parts of the machinery drawn may be under the direct and instant control of the tractor operator, thereby reducing the number of hands usually found necessary with devices of this character to a single mechanic.

A further object of the invention is to provide a tractor adapted particularly for use in connection with grain binders, which is so arranged as to be capable of either pushing or pulling the grain binding machinery.

A still further object of the invention is to provide means capable of being attached to the now well known tractors with but little trouble and at immaterial expense, which will so arrange the tractor to which it is applied as to be capable of performing or accomplishing the above mentioned ends.

With these objects in view, together with others which will appear as the description proceeds, the invention resides in the novel combination and arrangement of parts all as will be described more fully hereinafter, illustrated in the drawings, and particularly pointed out in the claims.

The invention will be better understood by reference to the accompanying drawings, wherein—
Figure 1 is a plan view of a conventional form of tractor illustrating improvements applied thereto in accordance with my invention,—Fig. 2 is a front elevation of the device illustrated in Fig. 1,—Fig. 3 is a side elevation of the device,—Fig. 4 is a detail perspective view of a portion of the improved front axle of the tractor, illustrating means through which certain of the movable parts of the drawn mechanism may be controlled,—and Fig. 5 is a slightly enlarged detail fragmentary section taken through another form of control mechanism.

Referring particularly to the drawings, 6 indicates a tractor frame of any preferred or shaped construction, being supported upon a rear axle 7, carrying a drive wheel 8, and being equipped with a suitable source of motive power, such as an engine 9 of the combustion type, for transmitting power to the drive wheels through suitable mechanism driven from the engine shaft 10, and for imparting power to other parts of the attachment as will be described more in detail hereafter.

The invention resides particularly in the front axle to be attached to the tractor and other parts associated therewith, the said front axle 11 being in this instance constructed of suitable substantial material, capable of being easily attached through the king pin 12 of the usual tractor of the type under consideration, and being suitably braced or supported by rods 13 attached thereto. The extreme ends of the axle are yoked as at 14 to provide means for supporting the knuckles 15 of the spindles carrying the front wheels 16. The front wheels may be connected through their knuckles by means of a steering rod 17, connected in any suitable manner with mechanism for steering the device from the tractor operator's position. Brace rods 18 may be pivotally connected at their opposite ends as at 19 and 20, to the axle 11 and frame 6 respectively, at points upon opposite sides of the king pin 12. By this arrangement it is apparent that the axle is braced sufficiently to withstand strains subjected thereto, but by reason of the pivot or swivel connection between the rods and the axle and frame, vertical oscillations or movements of the axle relative to the frame are permitted to enable the front or steering wheels of the tractor conforming to uneven or undulating ground.

The axle 11 is connected through the king pin 12 of the tractor in such manner as to extend beyond one side of the tractor frame a greater distance than at the other. The axle is so mounted as to provide a substantially elongated section at one end, protruding beyond the outermost lines of the tractor, to which various forms of farm or agricultural machinery may be attached to be drawn in close proximity to the tractor. Upon the elongated extension of the axle, and preferably upon the rear side thereof, are secured a pair of spaced brackets 21 within which is mounted for rotation a shaft 22 to extend longitudinally of the said axle. A beveled gear 23 is secured upon one end of the shaft 22, the said gear meshing with a similar gear 24 secured to a shaft 25 mounted in suitable bearings 26 to extend longitudinally of the tractor and forwardly of the axle 11. The opposite end of the shaft 22 has secured thereto a pulley 27, over which a belt 28 may be passed, the said belt passing over a pulley 29 mounted upon the engine shaft 10. It is apparent that upon operation of the engine, power will be transmitted through the belt 28 to the shaft 22, and thence through the beveled gears 23—24 to the forwardly projecting shaft 25. For use in connection with this above described power mechanism, a suitable frame 29' is secured to extend forwardly from the front axle to support mechanism of the push binder type, and intermeshing beveled gears 30 and 31 are arranged upon the forward end of the shaft 25 and upon the binder mechanism respectively whereby power may be imparted to the various movable elements of the latter.

To enable the tractor operator to control and adjust the various parts of the binder secured to the frame 29', such as the reel and sickle mechanism, a plurality of levers 32—33 are pivoted to extend upwardly from the axle 11, the said levers being connected through links 34—35 to the various mechanisms upon the binder machine which they are designed to control the movements of; the levers 32 being pivoted to travel over segments 36, a latch 37 being arranged on each lever for coöperation with its respective segment. The upper end of each of the levers 32 is connected with a rod 38 extending rearwardly to provide a handle 39 at the rear end thereof in position for convenient manipulation by the tractor operator. The levers 32 and the adjacent end of each of the links 38 are preferably connected through a swivel or ball and socket connection 40, and the extreme end of each rod 38 preferably projects forwardly beyond the swivel connection and is crooked as at 41, the said crooked portion being connected by a suitable wire 42 with the latch 37 upon its respective lever. By this arrangement it is apparent that the slight twisting of the rods 38 operates to disengage the latch 37 from its segment, whereupon pushing or pulling of the rod will operate to advance or retard the movement of the lever 32 to adjust the mechanism upon the push binder.

The control lever 33 may be provided at its free end with a swiveled block 43, and a worm screw 44 is threaded therethrough, the said worm screw being connected with a rod 45 extending to the rear end of the tractor to be provided at the latter end with a suitable hand operating wheel 46. Upon rotation of the rod 45 in either direction it is apparent that forward or swinging rearward movement of the lever 33 may be attained. The rear end of each of the rods 38—45 may be mounted for rotation within a suitable supporting bracket 47 secured to the tractor frame in such position as to be within convenient reach of the operator.

When the binder is secured to the forward end of the axle 11, and the gear 31 thereof is enmeshed with the gear 30 on the shaft 25, it is apparent that power may be applied through the mechanism 28—22—23—24—25, to the various movable mechanisms of the said binder. When it is desired to adjust these various mechanisms, the levers 32—33 may be operated from the tractor driver's position, and it is apparent that the entire binder mechanism is at all times under the instant and ready control of the tractor operator.

When desired, a pull binder may be attached to the extended end of the front axle 11 and the operating levers upon the said axle may be connected to the various parts thereof to enable the tractor operator to make the necessary adjustments therein.

While in the present instance I have illustrated and described my invention in connection with grain binders, it will be understood that its use is not necessarily restricted to farm or agricultural implements or machines of this particular type, but may be efficiently used in conjunction with most all machinery of this character employing power driven mechanism. It is also apparent that the various details of construction are susceptible of minor changes in shape or size without departing from the spirit of the invention, which right I reserve to myself.

I claim.

1. In a tractor, a front and rear axle supporting said tractor, said front axle being extended at one side of said tractor longer than at the other, a lever on said axle, and means for propelling said tractor, substantially as described.

2. In a tractor, a frame, a front and rear axle supporting said frame, said front axle being extended at one side of said frame longer than the other, a lever mounted on said front axle, and means for propelling said tractor, substantially as described.

3. In a tractor, a frame, a front and rear axle supporting said frame, a pair of shafts rotatably mounted on said front axle, means for imparting power from one shaft to the other, means for imparting movement to one of said shafts from said frame, and a gear on the other of said shafts, substantially as described.

4. In a tractor, a frame, a front and rear axle supporting said frame, said front axle being extended to project laterally beyond said tractor a distance greater at one side than at the other, and a brace rod pivotally connected at its opposite ends to said front axle and frame respectively at the opposite ends of the former, substantially as described.

5. In a tractor, a frame, a front and rear axle supporting said frame, said front axle being extended to project laterally beyond said tractor a distance greater at one side than at the other, a shaft mounted for rotation and to extend longitudinally of said axle adjacent its extended end, a second shaft mounted upon said axle to extend transversely thereof and to project forwardly therefrom, beveled gears on each of said shafts enmeshed with each other, a pulley on said first shaft, and means for imparting power from said tractor to said pulley, substantially as described.

6. In a tractor, a frame, a front and rear axle supporting said frame, said front axle being extended at one end to project laterally from said frame a greater distance than at the opposite end, a plurality of levers mounted for rocking movement upon said extended end, rods secured to said levers to extend beyond said frame, and a rod secured to each of said levers and extending rearwardly from said front axle to adjacent the rear of said frame, substantially as described.

7. In a device of the class described, an axle, a lever pivoted for rocking movement upon said axle, a segment, a latch on said lever adapted to coöperate with said segment to hold said lever in various positions of adjustment, a rod mounted for rotation on said lever, a crank on said rod, and a connection between said crank and said latch whereby the latter may be operated upon rotary movement of the former, substantially as described.

8. In a device of the class described, an axle, a lever pivoted for rocking movement on said axle, a segment, a latch on said lever adapted to coöperate with said segment to hold said lever in various positions of adjustment, a rod swiveled to said lever, a crank on said rod, and a connection between said crank and said latch whereby rotary movement of the former will operate to withdraw said latch from said segment, substantially as described.

9. In a device of the class described, a lever pivoted for rocking movement, a block pivoted upon said lever, the said block being provided with an internally threaded aperture, a worm gear threaded through said aperture, and a rod connected to said worm gear, substantially as described.

In testimony whereof I affix my signature in the presence of two witnesses.

GEORGE J. HUTTER.

Witnesses:
C. A. MITCHELL,
ROBT. W. McKINLEY.